Feb. 3, 1970  W. D. REYNOLDS ET AL  3,492,794

GAS CHROMATOGRAPHY COLUMN

Filed May 13, 1968

INVENTORS.
WARREN D. REYNOLDS
GEORGE E. PETERSEN
BY
ATTORNEYS

United States Patent Office 3,492,794
Patented Feb. 3, 1970

3,492,794
GAS CHROMATOGRAPHY COLUMN
Warren D. Reynolds, 147 Belgian Drive, Danville, Calif. 94526, and George E. Petersen, 4069 Delaware Drive, Fremont, Calif. 94538
Filed May 13, 1968, Ser. No. 728,384
Int. Cl. B01d 15/08
U.S. Cl. 55—386                 6 Claims

ABSTRACT OF THE DISCLOSURE

A gas chromatography column provided with a regular ordered geometric packing of fibrous or filamentary cone figuration constructed so that the column may be made of various diameters to enable it to process the separation of components of mixtures of substantial volume with high resolving power.

DESCRIPTION OF THE INVENTION

This invention relates to gas chromatography columns in general. More particularly, this invention relates to a gas chromatography column constructed to handle substantial volumes of mixtures which are to be separated into the components thereof with high resolving power.

Gas chromatography is a term which may properly be applied either to adsorption chromatography or gas-liquid partition chromatography. In adsorption chromatography a column containing appropriate adsorbent usually in granular form is used to separate the various constituents of a gas sample. The sample is generally introduced to the column in a carrier gas stream continuously flowing through the column. Under proper conditions various components of the gas sample are spatially separated by the process of selective adsorption and desorption so that the separated gas constituents issue from the end of the column in sequential order corresponding to their relative volatility, their molecular weight or other property affecting the degree of adsorption on the packing material in the column. Conventionally, as the separated gases emerge they are passed through a suitable detector element which in some way measures a property of the gas indicative of the character and amount present.

The essential feature of gas-liquid partition chromatography is the provision in the chromatographic column of an extensive liquid surface over which the gases flow. Normally this is accomplished by disposing the liquid in static condition as a very thin coating over the large exposed surface of an inert support. When a gas sample is passed through a column of this type the continuous solution and evaporation which takes place along the column makes use of selective solubility in a high boiling temperature liquid film whereby the lighter components are carried more rapidly to the outlet of the column than the heavier ones.

One of the disadvantages of packed chromatography columns results from the presence of inhomogeneities due to variations in packing material and other factors. These difficulties are most apparent in preparative columns which have greater cross-sectional areas than normally found in analytical columns. The net result of such inhomogeneities is to increase the "height equivalent to a theoretical plate" (HETP or H) of the column and thereby decrease its efficiency and its resolution capabilities. The term HETP is well known to workers in this field and is fully defined in the book "Gas Chromatography" by Howard Purnell, John Wiley and Sons, 1962, and in the book "Gas-Liquid Chromatography" by S. Dal Nogare and R. S. Juvet, Jr., Interscience Publishers, 1962.

A typical vapor fractometer column of either of these two types may be constructed of ¼" stainless steel or glass tubing in lengths of one or two meters. Some columns which are currently commercially available are in a U-shape or W-shape, while other columns are curved into a substantially helical configuration. For best vapor fractometer performance the uniform size of the packing material in the conventional column has proven to be important, as also has the uniformity with which the material is packed throughout the length of the column.

Gas chromatograph separation techniques now in general use require that the column be maintained at a temperature which is commensurate with and related to the vapor phase characteristics of the constituents in the sample undergoing separation.

The choice of the particular adsorbent or of the particular liquid to be used in partition chromatography depends upon the system under consideration. Conventional packing, in whatever form chosen for the particular chromatograph column, is poured into the column in granular form and compacted therein by vibration, tamping or the like. It has been the experience that such columns are prone to develop channels or to otherwise change their properties when subjected to vibration in handling or shipment. Furthermore, it is known that the optimum configuration of chromatograph packing should be one in which the average diffusion rate transverse to the nominal axis of gas flow through the column is large compared to the diffusion rate parallel to this nominal axis. There is no means for realizing this desirable relationship by normal packing techniques.

A second type of chromatographic column has no packing material. One form comprises a hollow tube internally coated with a partitioning agent. For gas-liquid separation, the column is internally coated with a film of partitioning agent of the kind supported on the celite structure of a conventional prior art column. For gas-solid separation, the column is internally coated with an absorbent material which may be in powder form. Another form of the present invention for gas-liquid separation consists of a hollow tube, the internal walls of which support a small thickness of loosely aggregated particles which are coated with a film of said partitioning agent.

The resolution of the capillaric type column is very high for early (time) eluted components. Since there is no obstruction to the flow of components (solute) and carrier-gas in the column center, the flow-velocity profile is faster in the center than along the liquid-coated wall surface, leading to a higher resistance to mass transfer process and, hence, lower efficiency.

The objective of the present invention is to gain the high resolving power of the capillary columns but still maintain the solute (adsorbate) capacity of the conventional diatomaceous earth or adsorbent type packed column. Another object of this invention is to provide a column with regular ordered geometric form of a packing such that scale-up thereof to preparative scale can be accomplished directly without loss of resolution.

These objectives are achieved by providing: (1) an ordered repetitive obstruction to the moving phase containing the components in the longitudinal direction; (2) provide open unobstructed flow routes to the moving phase in the axial direction within the column; (3) increase the surface area of the internal dimensions such that additional liquid phase coating can be present to selectively retard the flow of some of the components; (4) provide a continuous obstruction in the column center such that the normal "bullet-shaped" flow profile is interrupted.

The invention disclosed herein will be more readily apparent to those skilled in the art to which it relates from the following description and appended claims, taken in conjunction with the figures of the attached drawing wherein:

Figure 1:
FIG. 1 is a side view of an embodiment of column packing employing many radial wires, filaments or fibers in the form of a long brush.

Referring to the drawing in detail, there are shown in FIGURES 1 to 6, inclusive, several embodiments of a gas chromatography column employing packings having a regular ordered geometric structure made of fine wires, filaments or fibers which present a large surface that is adapted to be coated with a substance having different attractions to the different components of a mixture that is to be separated into its components. The fine wires, filaments or fibers may be either round or flat as well as other shape cross sections. They may be of minerals such as asbestos, or suitable metals or alloys, or synthetic fibers. Furthermore, they may be provided with fine fuzz coating to increase the surface area thereof.

Figure 2:
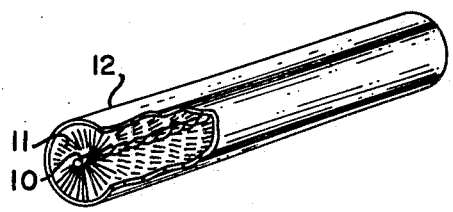
FIG. 2 is a view partially cut away showing a form of the packed chromatographic column employing a brush such as shown in FIG. 1 and embodying the features of the present invention.

The embodiment of this invention shown in FIGURES 1 and 2 is provided with a packing which is in the form of a brush in which the fine wires, filaments or fibers 11 are supported by the central member 10. The member 10 may be made of two wires which are twisted together and which grip the filaments 11 between the convolutions thereof so that when the packing is inserted into the column 12 the filaments 11 extend radially from the central member 10 towards the inner surface of the column. The column 12 may be made of various diameters, depending upon the volume of the mixture to be processed, and the lengths of the filaments 11 are selected so that they extend from the member 10 to the inner wall of the column. Thus, the vapor components passing through the column must weave their way between these filaments, and also, since the packing is more dense in the central part of the column, the vapors are caused to move out toward the inner wall of the column and, in doing so, contact the numerous surfaces of the filaments.

Figure 3:
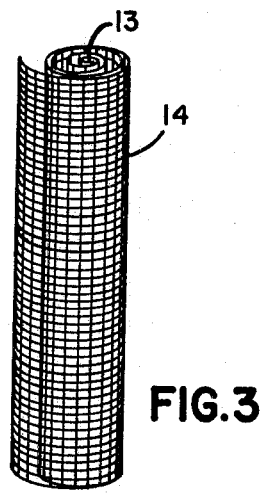
FIG. 3 is a side view of another embodiment of this invention showing a similar type of regular wire packing provided by coiling or rolling a suitable wire, filament or screen.
Figure 4:
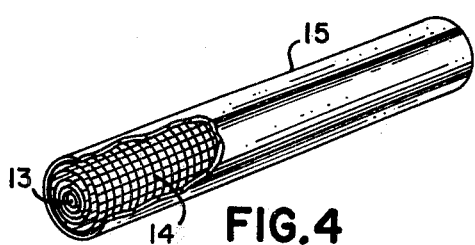
FIG. 4 is a view partially cut away showing another form of the packed chromatographic column employing a screen such as shown in FIG. 3 and embodying the features of the present invention.

Another embodiment of this invention employing packing of fine wires, filaments or fibers is shown in FIGS. 3 and 4 in which the packing is in the form of a coiled screen 14 which is coiled around the substantially rigid central member 13. The woof filaments of the screen are parallel to the member 13 and the warp consists of the filaments that cross the woof in the woven screen and are spiraled around the central member 13. Thus, the warp is radially displaced from the central member 13 as the filaments thereof are coiled around this member. This embodiment also provides a porous packing for the column and may also be used in columns of various diameters.

Figure 5:
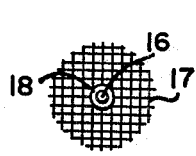
FIG. 5 is a view of a disc made of a screen of suitable wire, filament or fiber material.
Figure 6:
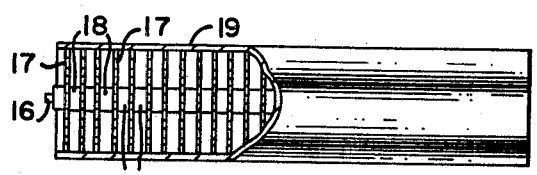
FIG. 6 is a view partially cut away showing a column packed with a plurality of screen discs such as shown in FIG. 5.

Another embodiment of this invention employing packing made of screen material is illustrated in FIGURES 5 and 6 in which a plurality of discs 17, which are made of screen material, is provided. The screen discs 17 are supported on the central member 16 and may be spaced by the spacers 18. The spacers 18 may be made of different thicknesses depending upon the spacing desired between the screen discs 17, or these spacers may be eliminated if it is desired to allow the screen discs 17 to rest upon each other to provide a more dense packing to the column 19.

An ordered, regular geometric structure presently available commercially and suitable for use in the present invention is sold under the commercial terms spiral brush or fine mesh screen.

When the column as illustrated in FIGS. 2, 4 or 6 is to be used for gas-solid adsorption chromatography, the surface area of all the fill wires, filaments or fibers and stem wires or central members along with the internal area of the column tubing itself are cleaned and etched in a conventional manner. Alternately, the radial wires, filaments or fibers on the brush or screen packing may possess highly irregular surfaces, fine holes or hollow fine wires attached to surfaces thereof to increase the surface area per unit length. In addition, the wires along with the interior walls of the tubing may be coated by conventional methods with high surface area inert solids such as powdered charcoal, silica-gel or alumina.

If the column is to be used for gas-liquid partition chromatography, the wires, filaments or fibers of the packing along with the interior of the column tubing are initially coated with a stationary liquid phase. The manner of coating the packing also forms no part of the present invention. One convenient technique for so doing is to incorporate the stationary liquid phase in a solution in a volatile solvent, fill the packed column with this solution and evaporate the volatile solvent through an open end. This leaves the relatively higher boiling stationary liquid phase uniformly dispersed throughout the walls and packing.

The size of the fill wires, filaments or fibers and stem wires is in such relation to the tube diameter that extremely rapid separation of components (solutes) is effected. The optimum size ratio being determined by carrier gas viscosity and pressure drops.

Figure 7:
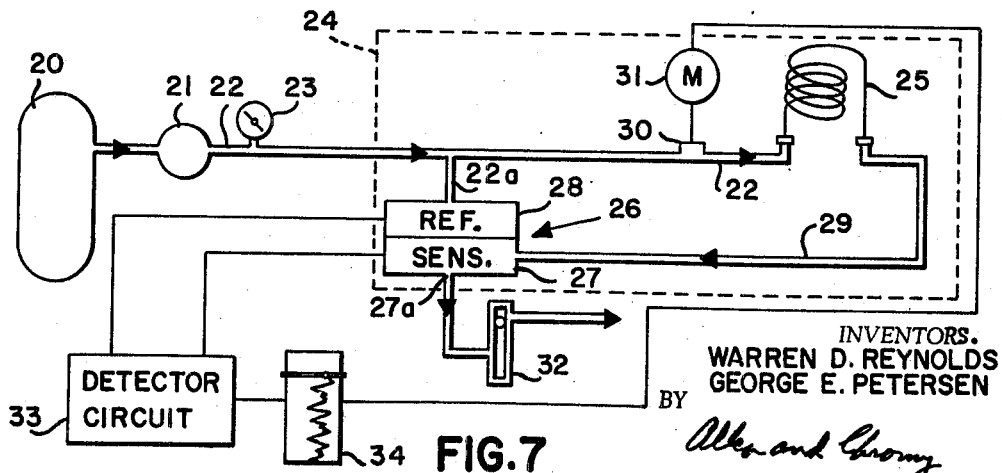
FIG. 7 is a complete gas chromatographic system employing the columns developed in the present invention.

A complete system embodying the present invention is illustrated in FIG. 7. In this system a source of carrier gas 20 which may be helium under pressure, for example, is connected through a conventional gas regulation device 21 to the carrier gas line 22 to the input side of the system for feeding the helium thereto. A pressure gauge 23 is connected to the input of the carrier gas to indicate gas pressure. A major portion of the path for the carrier gas is enclosed within a temperature-controlled chamber 24 which may be of the thermostatically-controlled air bath type.

The column 25 is of one or more of the types shown in FIGS. 1 to 6, inclusive, and the input end thereof is connected to the carrier gas line 22. Column 25, detector 26 and a sample injection device 30 of the system are schematically illustrated as being within the thermostatically controlled space 24.

The detector 26 used comprises two sections 27 and 28 which function as the sensing and reference sections, respectively. The sensing section detects thermal conductivity changes of the carrier gas due to the presence of constituents of the sample as they come off the column 25 through line 29 which is connected to the sensing section 27. The reference section 28 is connected to a carrier gas line 22 by a branch line 22a and responds to the carrier gas input. Reference section 28 thus is capable of providing a reliable reference signal which will vary commensurately with the carrier gas input to the system.

The sample injection device 30 is connected between the reference section 28 of the detector 26 and column 25. This sample injection device may be similar to the type disclosed in Patent No. 2,757,541 issued to Emmett S. Watson et al. on Aug. 7, 1956. The sample which is undergoing analysis is injected into the moving stream of carrier gas at this point and moves into and through the column 25 which is shown in FIG. 7 as a helically shaped tube for purposes of convenience and clarity. The column 25 may, of course, take numerous other configurations and still efficiently perform the function of separating the sample into a number of constituents which emerge from the column 25 at different times in accordance with their respective physical characteristics.

The sample constituents thus emerging from the column 25 are passed through the sensing side 27 of the detector 26 where they are detected by thermal conductivity measurement in the case illustrated. Other appropriate means may be employed to detect the vapors emerging from the column, such as ionization voltage, or gas density balance, for example. From the exit side 27a of the thermal conductivity detector 26, the sample components are passed through a flow meter 32 and may be either disposed of as waste or accumulated in an appropriate collecting system, if further analysis of the separated vapors is desired. The amount of each collected, for instance, may provide a sample for infrared analysis.

The reference section 28 and the sensing section 27 of the thermal conductivity detector 26 are connected to an appropriate electrical detector circuit 33 which may comprise a balance bridge of the Wheatstone type. The electrical output signal of the bridge circuit is commensurate with the excess of the thermal conductivity of the vapor passing through the sensing section 27 of the detector 26 over the thermal conductivity of the carrier gas and is therefore indicative of the separated components of the sample as they emerge from the gas chromatographic column 25.

The signal output from the Wheatstone bridge is suitably amplified and sent to a suitable recording device 34 customarily used with conventional gas chromatographic equipment.

What we claim is:

1. A chromatographic column for the separation of components of a mixture, the combination comprising a hollow tube, a member extending longitudinally through said tube, a plurality of filaments extending substantially across said tube in a direction substantially at right angles to the axis of said tube between said member and the inside wall of said tube, means comprising said members supporting said filaments and forming therewith a regular and predetermined orderly structure in said tube, said filaments, supporting means, and inner surface of said hollow tube being coated with a substance with which the different components of said mixture have different attractions.

2. A chromatographic column for the separation of components of a mixture, in the combination as set forth in claim 1, further characterized in that said filaments extending substantially at right angles to said member comprise filaments attached to said member and radiating therefrom.

3. A chromatographic column for the separation of components of a mixture, the combination as set forth in claim 2, further characterized in that said filaments and said member comprise a brush-shaped structure.

4. A chromatographic column for the separation of components of a mixture, the combination as set forth in claim 1, further characterized in that said filaments extending substantially at right angles to said member comprise filaments that spiral away from said member.

5. A chromatographic column for the separation of components of a mixture, the combination as set forth in claim 4, further characterized in that said supporting means includes filaments disposed parallel to said member contacting said spiraling filaments at predetermined spaced points.

6. A chromatographic column for the separation of components of a mixture, the combination as set forth in claim 1, further characterized in that said filaments, and part of said supporting means comprise a screen coiled around said member.

References Cited
UNITED STATES PATENTS

| | | | |
|---|---|---|---|
| 3,143,404 | 8/1964 | Heigl | 55—386 X |
| 3,264,801 | 8/1966 | Buhl et al. | 55—67 |
| 3,298,527 | 1/1967 | Wright | 55—386 X |

JAMES L. DECESARE, Primary Examiner